Figure 1:
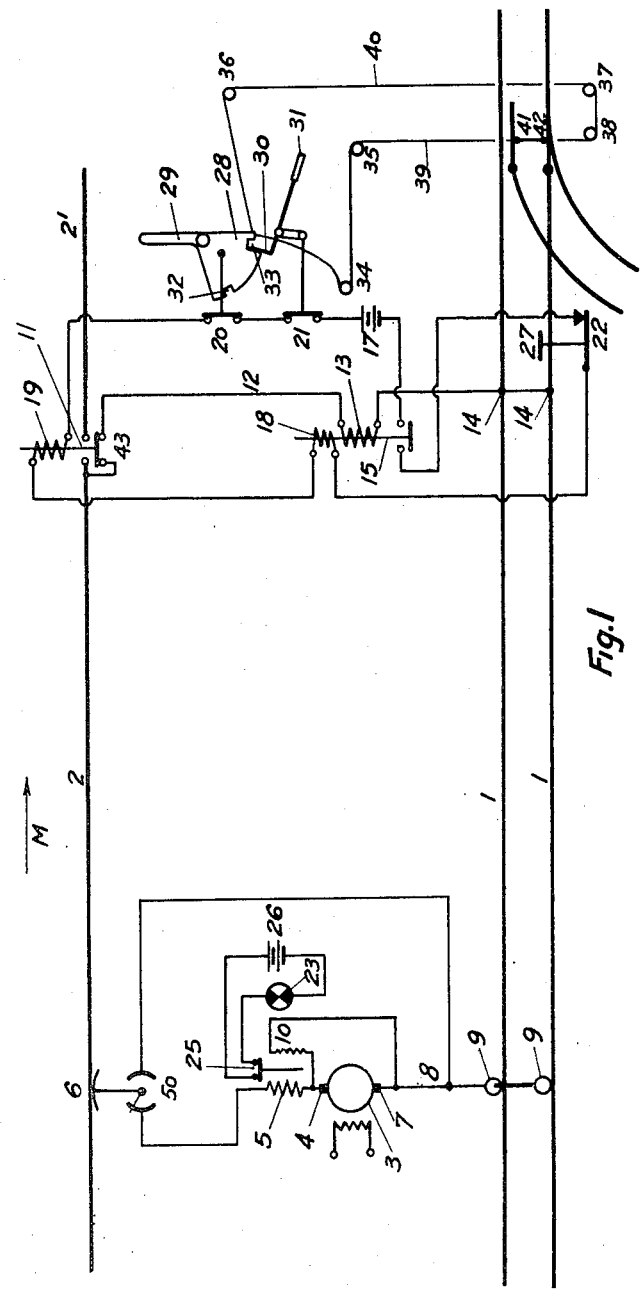

Oct. 16, 1951     R. A. TUOT     2,571,499
RAILROAD SIGNALING DEVICE

Filed March 15, 1946     3 Sheets-Sheet 2

INVENTOR:
RAYMOND A. TUOT
By Young, Emery & Thompson
Attys.

Oct. 16, 1951   R. A. TUOT   2,571,499
RAILROAD SIGNALING DEVICE
Filed March 15, 1946   3 Sheets-Sheet 3

INVENTOR:
RAYMOND A. TUOT
By: Young, Emery & Thompson
Attys.

Patented Oct. 16, 1951

2,571,499

UNITED STATES PATENT OFFICE 2,571,499

RAILROAD SIGNALING DEVICE

Raymond Arthur Tuot, Paris, France, assignor of one-half to Societe Auxiliaire d'Etudes Electrotechniques, Paris, France, a corporation, and one-half to Societe Suisse d'Electricite et de Traction, Basel, Switzerland, a corporation Application March 15, 1946, Serial No. 654,569
In France April 11, 1945

2 Claims. (Cl. 246—68)

Electric signalling devices for railroads are known, which include safety or alarm apparatus carried inside the engineer's cab on each locomotive and also in proximity with the critical points of the track such as switches, crossings, level crossings, stations and the like. Such apparatus are connected in a circuit including the track rails and a pilot lead insulated with reference to said rails and having a high impedance, or a high resistance in the case of direct current and with which contacting sliders carried by each locomotive may engage. The operation of said apparatus is produced by a signalling current which may be direct or constant frequency alternating current produced by a tachymetric generator carried by the locomotive and the voltage at the terminals of which is proportional to the speed of progress of said locomotive. The operation of such apparatus depends thus not only on the distance existing between the locomotive and the critical point of the track or a train located ahead of said locomotive, but also on the speed of operation of the latter.

Arrangements of this type, such as described in the U. S. patents to Tuot Nos. 2,098,363 and 2,154,877, which do not require any visible signal on the track are applicable as well to steam traction as to electric traction. In this latter case, it is possible to use as a pilot lead, the contact line feeding the traction current, provided different frequencies are used for the signalling current and for the traction current while filters are employed for separating these two currents.

In order that the locomotives may act properly on one another, each of them includes in addition to the alarm devices and to the relays actuating them the following arrangements:

A selecting device which protects said relays and alarm devices against the action of the currents transmitted by the locomotive rearwardly or received by it from the rear by reason of the presence behind it of another locomotive.

And a rotary switch driven at an angular speed proportional to the speed of progression and establishing between the pilot lead and the rails on which the locomotive moves in alternation the voltage of the generator adapted to adjust the progression of the locomotive considered and the short circuit required for adjusting the progression of the locomotive behind the locomotive considered.

In a device thus constructed, if I designates the intensity of the current in the signalling circuit, $z$ the linear impedance of the circuit, D the distance of the locomotive from the obstacle, and E the tension of the feed current, then:

$$I = \frac{E}{zD}$$

But E is proportional to the speed of travel V.

$$E = KV$$

Therefore, $$I = \frac{KV}{zD}$$

If $i$ is the constant intensity effecting the release of the warning apparatus mounted on the locomotive, this apparatus operates at a distance $d$ from an obstacle such that:

$$i = \frac{KV}{zd}$$

or, $$d = \frac{KV}{iz}$$

This distance is, therefore, proportional to the speed of the train V which is an advantage relative to the signalling system utilizing fixed signals located along the track.

On the other hand, the distance $D_f$ required for stopping the train from the moment when the operator begins to brake the train is substantially proportional to the square of the speed of travel at that time, $$D_f = K_f V^2$$

For safety, it is evidently necessary that the warning distance $d$ be at least equal to $D_f$, the distance necessary for effecting the stopping of the train.

$$\frac{KV}{iz} \geq K_f V^2$$

or, $$i \leq \frac{K}{K_f z V}$$

If $V_m$ designates the maximum speed that the locomotive may have, the constant intensity determining the operation of the warning relay must, therefore, be less or equal to $$\frac{K}{K_f z V_m}$$

It results that for speeds less than $V_m$, the warning distance is greater than the distance necessary for effecting the stopping of the train.

The present invention has for its object the avoidance of this disadvantage and to permit the operator to control the braking only at a suitable distance.

My present invention covers the manner of actuating through the signalling current the alarm device on the locomotive.

According to my invention, the apparatus carried by the locomotive for generating the signalling current acts on relays of the wattmetric type, i. e. through the power produced by it. These relays include an intensity winding through which the signalling current flows and a voltage winding subjected to the difference in potential existing between the terminals of the apparatus generating the signalling current.

In such a system, operation depends always as in the case of the prior abovementioned devices on the distance comprised between the locomotive and the hindrance located in front thereof, but on the other hand this operation depends not only on the simple value of the speed of progression but on the square of said speed as will be disclosed hereinafter.

I have illustrated diagrammatically by way of example in the accompanying drawings one form of my invention including a special pilot lead intended for the transportation of the signalling current.

In these drawings, an obstacle is supposed to be located in front of the locomotive.

Figure 2:
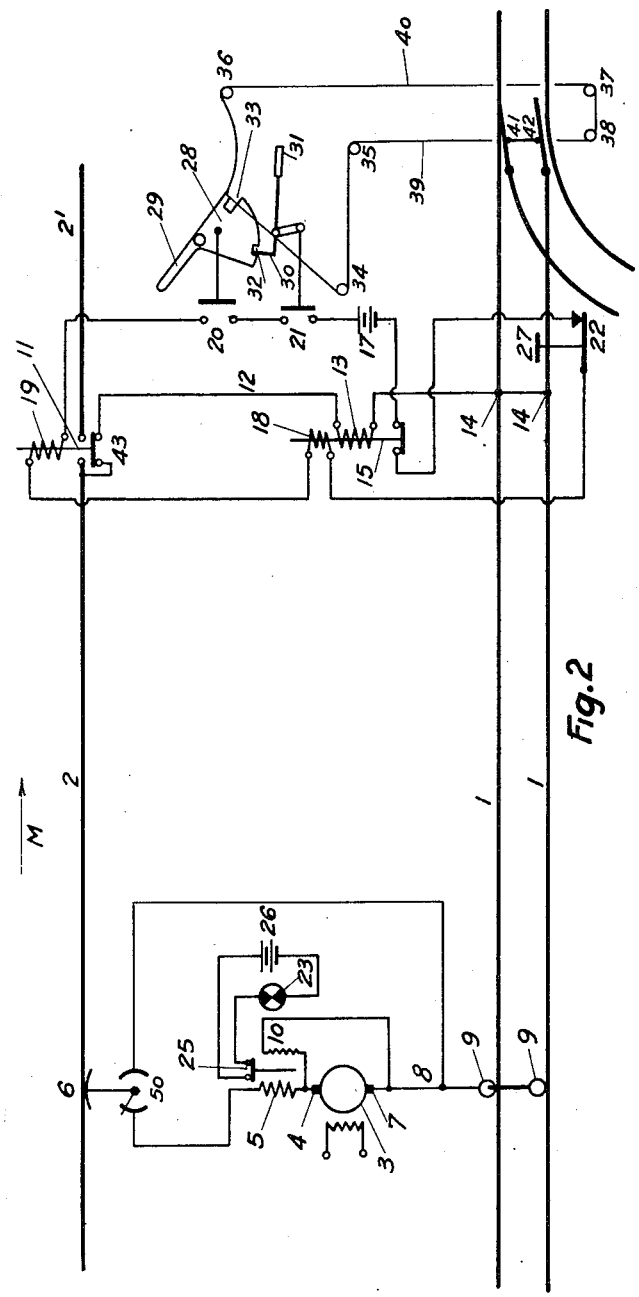

According to Figs. 1 and 2, this obstacle is a track switch, properly placed in Fig. 1 and improperly placed in Fig. 2.

Figure 3:
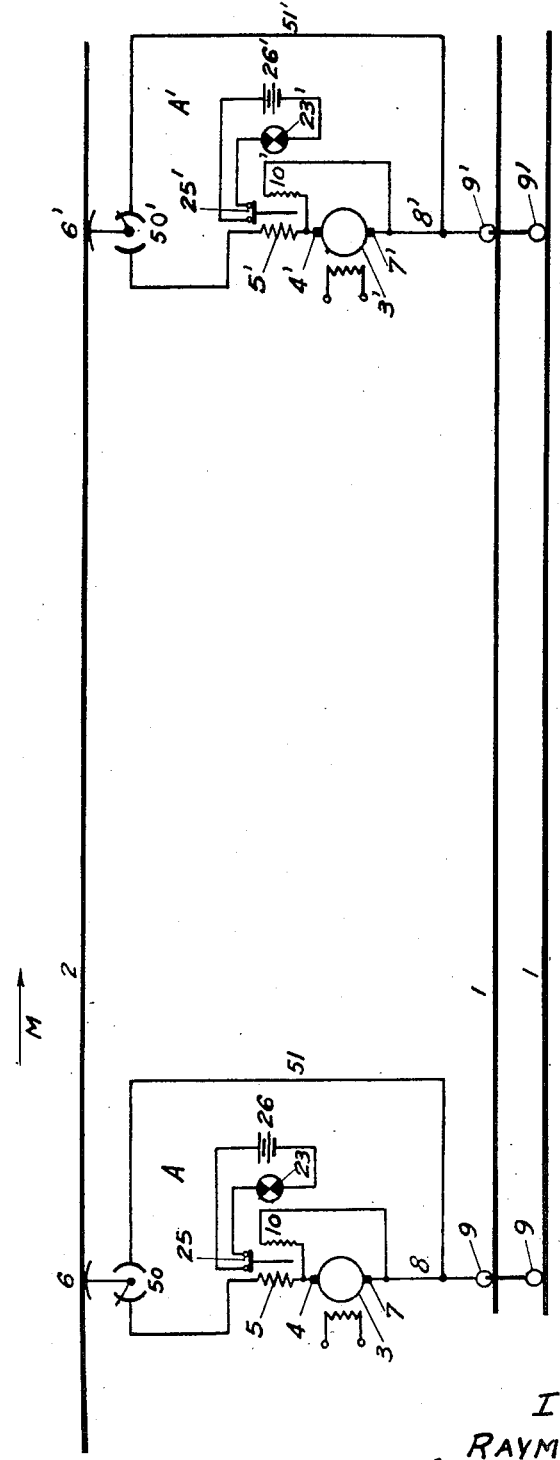

In Fig. 3 the obstacle is formed by another train.

In said drawings, in which for sake of simplicity, I have not shown the means provided for selecting the current on board of the locomotive, I have shown at 1 the rails on which the train runs and at 2 the pilot conductor. The arrow M shows the direction of progression of the train. The tachymetric generator shown at 3 is constituted for instance by a D. C. dynamo-machine producing the signalling current. One of the terminals 4 of said dynamo-machine is connected with the pilot conductor 2 through the intensity winding 5 of a wattmetric relay and through the contacting slider 6. The other terminal 7 of said dynamo machine is connected with the rails 1 through the lead 8, the body of the locomotive and the wheels 9. The voltage winding 10 of the wattmetric relay is directly connected with the terminals 4 and 7 of the generator 3.

The wattmetric relay 5, 10 controls a contact 25 inserted in a circuit comprising the warning signal 23 and a source 26 feeding this circuit when the contact 25 is closed.

The rotary commutator is shown at 50. This element is driven at an angular speed proportional to the speed of travel and it establishes between the pilot conductor and the track rails alternatively the voltage of the generator 3 (for regulating the speed of travel) and the short circuit regulating the speed of travel of the locomotive behind the locomotive under consideration. This rotary commutator is not claimed in the present specification.

The pilot conductor extending alongside of the track is interrupted in front of the next critical point which may be a switch for instance as shown in Figures 1 and 2. At said point, the pilot conductor is in contact with the movable armature 11 of an electric switch. In its inoperative position as shown in the drawing, this switch connects electrically the pilot conductor with a wire 12 followed by the winding of the relay 13 having a very low impedance and connected at 14 with the rails 1.

Thus any track apparatus normally short circuits the section 2 of the pilot conductor over the rails 1.

The track switch shown in a manner as simple as possible in the Figs. 1 and 2, has two blades 41 and 42, connecting for example a spur track to the main track.

As shown in Figs. 1 and 2, the switch is controlled by a lever 29 integral with a sector 28 which is connected by a link with the movable part of the contactor 20. This sector is also connected to the two blades of the switch which are connected by a spacer bar. The lever 29 is connected to the switch blades by two cables 39 and 40, the first of which passes over pulleys 34 and 35 and the second of which passes over pulleys 36, 37 and 38.

Sector 28 has two notches 32 and 33 (the second deeper than the first) for engagement and cooperation with a pawl 30 urged into the notches by a counterweight 31. Pawl 30 is connected to the movable element of contactor 21 by a link.

When lever 29 is vertical (Fig. 1), the blade 42 of the switch drawn by the cable 40 is applied against its cooperating rail. In this position, the track is clear for a train arriving in the direction M. In these conditions, the contactor 20 is closed.

If, moreover, the lever 29 is locked in this position by the pawl 30 engaged in the notch 33, the contactor 21 is likewise closed.

On the contrary, if the lever 29 is inclined as shown in Fig. 2, the blade 41 of the switch is applied against its cooperating rail and the blade 42 is spaced from its cooperating rail. The switch then occupies a dangerous position for a train arriving in the direction M.

In this case, the contactor 20 is open. Furthermore, the pawl 30 is engaged in the notch 32 but since this is not as deep as notch 33, the contactor 21 remains open which insures double safety.

All the elements relating to the track switch are given by way of example and are not claimed in the present specification.

If the track switch occupies a position allowing the passage of a train, the contacts 20 and 21 are closed. On the approach of the locomotive, the intensity increases in 13, which produces in 15 the closing of the circuit of the electromagnet 19. Consequently, 43 connects 2 to 2'; the short circuit specified therefore, is eliminated.

The connection established between 2 and 2' increases the impedance of the signalling circuit, the warning signal is not actuated.

At the passage of the locomotive, the pedal 27 is depressed and the interrupter 22 opens the circuit, whereby the armature 11 is released.

The signalling circuit is always closed in front of the locomotive, as at each singular point of the track, there are conductors like 43, 12, 13 and 14, between the pilot conductor 2 and the track rail 1.

The pilot conductor is given an impedance (or a resistance in the case of direct current) which is sufficiently high for it to predominate over that of the circuit fed by the generator 3 of the locomotive. Therefore, the conductors 43, 12, 13 and 14 are of very small impedances and form a short circuit.

This short circuit has the effect of limiting the link and consequently the impedance of the circuit fed by the tachymetric generator 3 and thus maintaining above a minimum the intensity and the power furnished by this generator which contributes to the control of the operation of the signalling apparatus.

Under such conditions, the total impedance of this circuit may be considered as proportional to the distance comprised between the locomotive and the track apparatus producing the short-circuit.

If, the point is improperly placed (position of Fig. 2), the contactors 20 and 21 are open, the electro-magnet 19 not being excited, the circuit 43, 12, 13, 14 is maintained and when the locomotive arrives at a position at which the engineer must apply the brakes, the warning signal 23 functions under the effect of the wattmetric relay 5, 10.

If the locomotive considered A is preceded by a locomotive A' moving on the same track, these two locomotives being represented on Fig. 3 for purposes of example, the locomotive A' produces the short circuit 6', 50', 51', 8', 9'.

On the locomotive A, the operation of the warning signal 23 under the action of the relay 5, 10 produces, therefore, in the same manner when the locomotive sufficiently approaches either a fixed obstacle associated with the track (Fig. 2) or a train moving in front. The operation of the simplified arrangement which has just been described is as follows:

The locomotive being in motion in the direction M, the power furnished by the tachymetric generator 3 may be expressed as follows:

$$W = EI = KV\frac{KV}{zD} = \frac{K^2V^2}{zD}$$

If $w$ designates the constant power for which the wattmetric relay 5, 10 releases the signal 23, this signal will operate at the distance $d$ from the obstacle (warning distance)

$$d = \frac{K^2V^2}{zw}$$

This distance is, therefore, proportional to the square of the speed.

For safety, it is certainly necessary that the warning distance $d$ be greater or equal to $D_f$, the distance necessary for effecting the stopping of the train; therefore, $$\frac{K^2V^2}{zw} \geq K_f V^2$$

or, $$w \leq \frac{K^2}{K_f z}$$

The second member is independent of the speed. It suffices therefore, to regulate the wattmetric relay 5, 10 in such a manner that its signal 23 is released by a power equal to $$\frac{K^2}{K_f z}$$

In this case, the warning distance is equal to the distance necessary for determining the stopping regardless of the speed of the train. Therefore, the braking may be commenced only at the necessary moment and the train can retain its speed up to this moment.

In the case where the current provided by the tachymetric generator is constituted by A. C. it is necessary that at every moment the impedance of the circuit may be as exactly as possible proportional to the distance separating the locomotive from the short circuit.

Now this impedance includes on one hand the ohmic resistance of the circuit and on the other hand its reactance.

It is not possible to avoid any accidental variation in the ohmic resistance, chiefly at the points of connection or of contact between the different parts of the signalling circuits; the action of these variations on the general operation can be detrimental only when the ohmic resistance is not very high.

On the contrary, the reactance of the signalling circuit depends solely on the geometric shape of said circuit and it is proportional to the length comprised between the locomotive and the short circuit.

In order that the impedance may be in its turn substantially proportional to the length of the circuit, it is necessary for the ohmic resistance of the signalling circuit to be negligible with reference to the reactance whenever the ohmic resistance is not very high.

According to my invention and in the case where the reactance has thus a predominating action, there is used for the actuation of the signals, relays of the wattmetric type operating through their reactive power.

What I claim is:

1. A signalling system of railroads comprising an electric tachymetric generator carried by a locomotive and having a voltage across its terminals proportional to the speed of travel of the locomotive; a signalling circuit including track rails, a pilot conductor of high impedance extending along the track rails, means for connecting one terminal of the generator to said track rails and the other terminal to the pilot conductor, means of connection between the pilot conductor and track rails, said connection being located at the next obstacle in front of the locomotive, a warning signal carried by the locomotive, said signal being permanently controlled by a wattmetric relay carried also by the locomotive, and actuated if the active power through said relay attains a predetermined value, the current winding of said relay being interposed between one terminal of the generator and the pilot conductor, the voltage winding of said relay being connected across the terminals of the generator.

2. A signalling system of railroads comprising an electric tachymetric generator carried by a locomotive and having a voltage across its terminals proportional to the speed of travel of the locomotive; a signalling circuit including track rails, a pilot conductor of high impedance extending along the track rails, means for connecting one terminal of the generator to said track rails and the other terminal to the pilot conductor, means of connection between the pilot conductor and track rails, said connection being located at the next obstacle in front of the locomotive, a warning signal carried by the locomotive, said signal being permanently controlled by a wattmetric relay carried also by the locomotive, and actuated if the reactive power through said relay attains a predetermined value, the current winding of said relay being interposed between one terminal, of the generator and the pilot conductor, the voltage winding of said relay being connected across the terminals of the generator.

RAYMOND ARTHUR TUOT.

REFERENCES CITED

The following references are of record in the file of this patent:

UNITED STATES PATENTS

| Number | Name | Date |
|---|---|---|
| 1,152,953 | Kerr | Sept. 7, 1915 |